United States Patent
Ma et al.

(10) Patent No.: US 12,271,748 B2
(45) Date of Patent: Apr. 8, 2025

(54) CHANGING PROGRAM BEHAVIOR AT RUNTIME

(71) Applicant: Microsoft Technology Licensing, LLC, Redmond, WA (US)

(72) Inventors: Jingyu Ma, Chong Qing (CN); Yong Liu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 467 days.

(21) Appl. No.: 17/702,647

(22) Filed: Mar. 23, 2022

(65) Prior Publication Data

US 2023/0305868 A1   Sep. 28, 2023

(51) Int. Cl.
*G06F 9/44* (2018.01)
*G06F 9/32* (2018.01)
*G06F 9/38* (2018.01)
*G06F 9/455* (2018.01)

(52) U.S. Cl.
CPC .......... *G06F 9/45516* (2013.01); *G06F 9/328* (2013.01); *G06F 9/3806* (2013.01)

(58) Field of Classification Search
CPC .................................... G06F 9/45516
USPC ........................................ 717/140
See application file for complete search history.

(56) References Cited

U.S. PATENT DOCUMENTS

| 7,631,022 | B2 * | 12/2009 | Hasegawa | G06F 16/10 |
| 9,110,756 | B1 * | 8/2015 | Guo | G06F 8/65 |
| 11,256,499 | B2 * | 2/2022 | Manvar | G06F 8/654 |
| 2006/0200815 | A1 * | 9/2006 | Li | G06F 9/4486 |
| | | | | 712/E9.083 |
| 2018/0088936 | A1 * | 3/2018 | Tanimoto | G06F 8/65 |
| 2023/0140552 | A1 * | 5/2023 | Turgut | G06F 11/3688 |
| | | | | 717/124 |

FOREIGN PATENT DOCUMENTS

| DE | 112021000418 T5 * | 10/2022 | ........... G05B 19/042 |
| WO | WO-2021249518 A1 * | 12/2021 | |

OTHER PUBLICATIONS

"Isolator++ Professional-Typemock", Retrieved From: https://web.archive.org/web/20210612174249/https://www.typemock.com/isolatorpp-product-page/, Jun. 12, 2021, 7 Pages.

* cited by examiner

*Primary Examiner* — Evral E Bodden
(74) *Attorney, Agent, or Firm* — Workman Nydegger

(57) ABSTRACT

A computer system is configured to override an original behavior of a function at runtime. Overriding the original behavior of the function at runtime includes identifying an override behavior for overriding the original behavior of the function, and encoding replacement code based on the override behavior. Further, a size of the replacement code is identified, and a first memory address of the function where code of the function is stored is also identified. The computer system then copies a block of code having the size of the replacement code from the first memory address to a second memory address, and copies the replacement code to the first memory address. After the replacement code is executed, copying the block of code stored at the second memory address back to the first memory address, restoring the code of the function.

20 Claims, 11 Drawing Sheets

CHANGING PROGRAM BEHAVIOR AT RUNTIME

BACKGROUND

Due to the lack of reflection in some programming languages, such as (but not limited to C++), it is hard to abstract the dependencies of variables in some source code. For example, a large C++ codebase may include legacy source code that was written many years ago. Testing such legacy source code can be very difficult, especially when the legacy source code was not written in a test-friendly manner.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computer system configured to override an original behavior of a function at runtime without changing source code of the function. To override the original behavior of the function at runtime, the computer system identifies an override behavior for overriding the original behavior of the function. The computer system then encodes replacement code based on the override behavior and identifies a size of the replacement code. The computer system also identifies a memory address (also referred to as a first memory address) of the function. Thereafter, the computer system copies a block of code having the size of the replacement code from the first memory address to a second memory address, and copies the replacement code to the first memory address. After the replacement code is executed, the block of code stored at the second memory address is then copied back to the first memory address, restoring the code of the function.

In some embodiments, the override behavior includes overriding a return value of the function with a predetermined return value. In some embodiments, the override behavior includes overriding the function with a second function.

When the override behavior includes overriding a return value of the function, the computer system is further configured to identify a particular register that stores a return value of the function and encodes the replacement code configured to move the predetermined return value into the particular register. In some embodiments, encoding the replacement code further includes determining a size of the return value of the function in machine code format, and encoding the predetermined return value into machine code having the size of the return value. In some embodiments, such as when using the ARM64 instruction set architecture (ISA), when the predetermined return value is an integer that is less than 8 bits, encoding the predetermined return value includes multiplying the predetermined return value by 32.

In some embodiments, encoding the replacement code further includes determining whether the size of the replacement code is no greater than a size of the code of the function. In response to determining that the size of the replacement code is no greater than the size of the code of the function, the computer system then restores the replacement code at the first memory address.

In response to determining the size of the replacement code is greater than the size of the code of the function, the computer system stores the replacement code at a third memory address; and encodes second replacement code containing the third memory address where the replacement code is stored. The computer system then identifies a second size of the second replacement code and copies a second block of code having the second size of the replacement code from the first memory address to the second memory address. The computer system then copies the second replacement code to the first memory address, pointing to the third memory address where the replacement code is stored. After the replacement code is executed, the second block of code stored at the second memory address is then copied back to the first memory address.

The embodiments described herein are also related to a method implemented at a computer system for overriding an original behavior of a function at runtime. The method includes identifying an override behavior for overriding the original behavior of the function. The override behavior includes at least one of (1) overriding a return value of the function with a predetermined return value, or (2) overriding the function with a second function.

The method further includes encoding replacement code based on the override behavior, identifying a size of the replacement code, and identifying a first memory address of the function where code of the function is stored. Thereafter, a block of code having the size of the replacement code is copied from the first memory address to a second memory address, and the replacement code is then copied to the first memory address. After the replacement code is executed, the block of code stored at the second memory address is then copied back to the first memory address, restoring the code of the function.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which.

DETAILED DESCRIPTION

Figure 1:
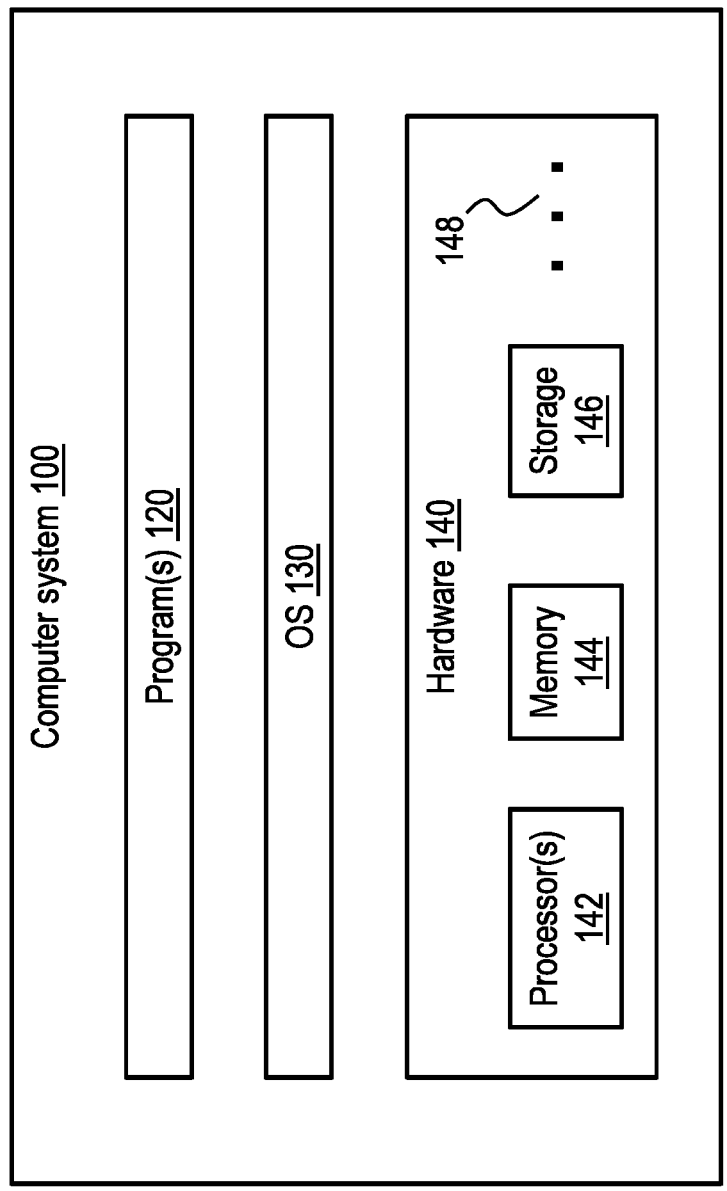
FIG. 1 illustrates an example architecture of a computer system in which the principles described herein may be employed.

Due to the lack of reflection in some programming languages, such as (but not limited to C++), it is hard to abstract the dependencies of variables in some source code. For example, a large C++ codebase may include legacy source code that was written many years ago. Testing such legacy source code can be very difficult, especially when the legacy source code was not written in a test-friendly manner. Take the code below as an example:

```
int markProcessValidated(Process* p)
{
  if(p == nullptr)
    return -1;
  bool isSuccess = VerifyCertInMachine( ); // Read cert from
local
    disk
  if (!isSuccess)
    return -2;
  p->IsValidated = true; // to be tested
  return 0; // to be tested
}
```

An engineer may want to test the last two lines of the above source code that are annotated as "to be tested." However, writing a test to cover those two lines of source code is very difficult, because the function, VerifyCertInMachine ( ) needs to read a certificate from a local disk. Traditionally, either a valid certificate needs to be installed in a test environment, or the code needs to be refactored before testing. Installing a valid cert may introduce the complexity of certificate maintenance as well as security issues.

Further, refactoring the code may introduce another set of complications. For example, refactoring the production source code may require the production source code to be changed to the follows:

```
int markProcessValidated(Process* p, ICertValidator* certValidator)
{
  if(p == nullptr)
    return -1;
  bool isSuccess = certValidator->VerifyCertInMachine( );
  if (!isSuccess)
    return -2;
  p->IsValidated = true;
  return 0;
}
```

As shown above, when testing the refactored code, a fake certValidator needs to be passed into the function, markProcessValidated, while in production source code, a real certValidator needs to be passed in. There is always a risk when production source code is changed, especially when the production source code is maintained in a large commercial codebase. For example, the above example of change may introduce an unpredictable impact if the function, markProcessValidated, is used by multiple components owned by different teams.

The principles described herein solve the above-described problems by allowing a computer system to override an original behavior of a function at runtime without changing the source code of the function. To override the original behavior of the function at runtime, the computer system identifies an override behavior for overriding the original behavior of the function. The computer system then encodes replacement code based on the override behavior and identifies a size of the replacement code. The computer system also identifies a memory address (also referred to as a first memory address) of the function. Thereafter, the computer system copies a block of code having the size of the replacement code from the first memory address to a second memory address, and copies the replacement code to the first memory address. After the replacement code is executed, the block of code stored at the second memory address is then copied back to the first memory address, restoring the code of the function.

FIG. 1 illustrates an example computer system 100 in which the principles described herein may be implemented. The computer system 100 includes hardware 140 and an operating system 130 that together make the computer system usable by users and programs 120. The operating system 130 is often the core software running on the computer system, although there may be additional software layers on top of an operating system that provides other interfaces to users or programs of the system. The hardware 140 of the computer system 100 includes one or more processor(s) 142 (e.g., a central processing unit (CPU)), memory 144 (e.g., random access memory (RAM)), and storage 146 (e.g., hard disks). The ellipsis 148 represents that there may be additional hardware components that are part of the computer system 100, such as (but not limited to) input/output devices (e.g., keyboard, display, touch screen, etc.). The processor(s) 142 run instructions and compute data and memory addresses. The memory 144 stores data and instructions of running programs.

For source code written in a compiled language (e.g., but not limited to, C++), the source code is first transformed into machine code (e.g., binary code). This transformation is performed by a program called a compiler. The compiled machine code can then be loaded in the memory 144 and executed by the processor(s) 142. As such, traditionally, to change the runtime behavior of a program, the source code of the program needs to be changed, and the changed source code can then be compiled to changed machine code, which can then be loaded into the memory 144 and executed by the processor(s) 142.

Figure 2:
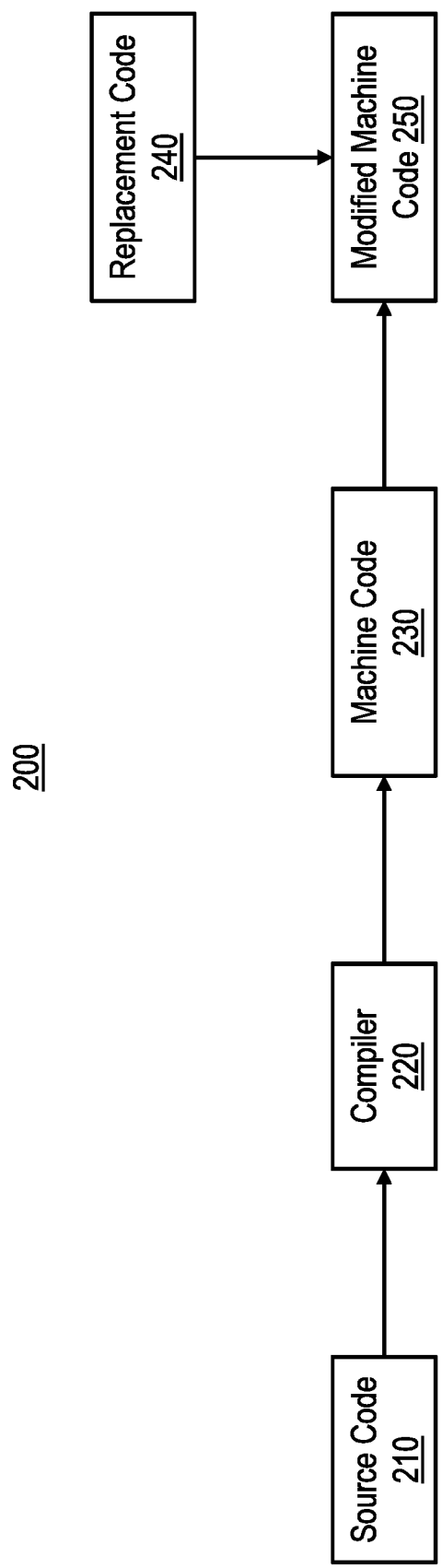
FIG. 2 illustrates an example process of modifying machine code of a program with replacement code to change an original behavior of the program.

The principles described herein introduce a novel process of changing the behavior of a program without changing the source code thereof. FIG. 2 illustrates a diagram of an example of this novel process 200 for changing the original behavior of a program without changing the source code thereof. As illustrated in FIG. 2, the source code of the program 210 is first compiled by a compiler 220 into machine code 230. During run time, while the machine code 230 is loaded in a memory of a computer system (e.g., memory 144), the computer system generates replacement code 240 based on a desired override behavior and injects the replacement code 240 into the memory, where the machine code 230 of the program is originally stored, to generate modified machine code 250. The execution of the modified machine code 250 would cause the computer system to behave differently from the execution of the machine code 230 of the program. After the modified machine code 250 is executed, the machine code 230 of the program is then restored back to the memory.

Figure 3A:
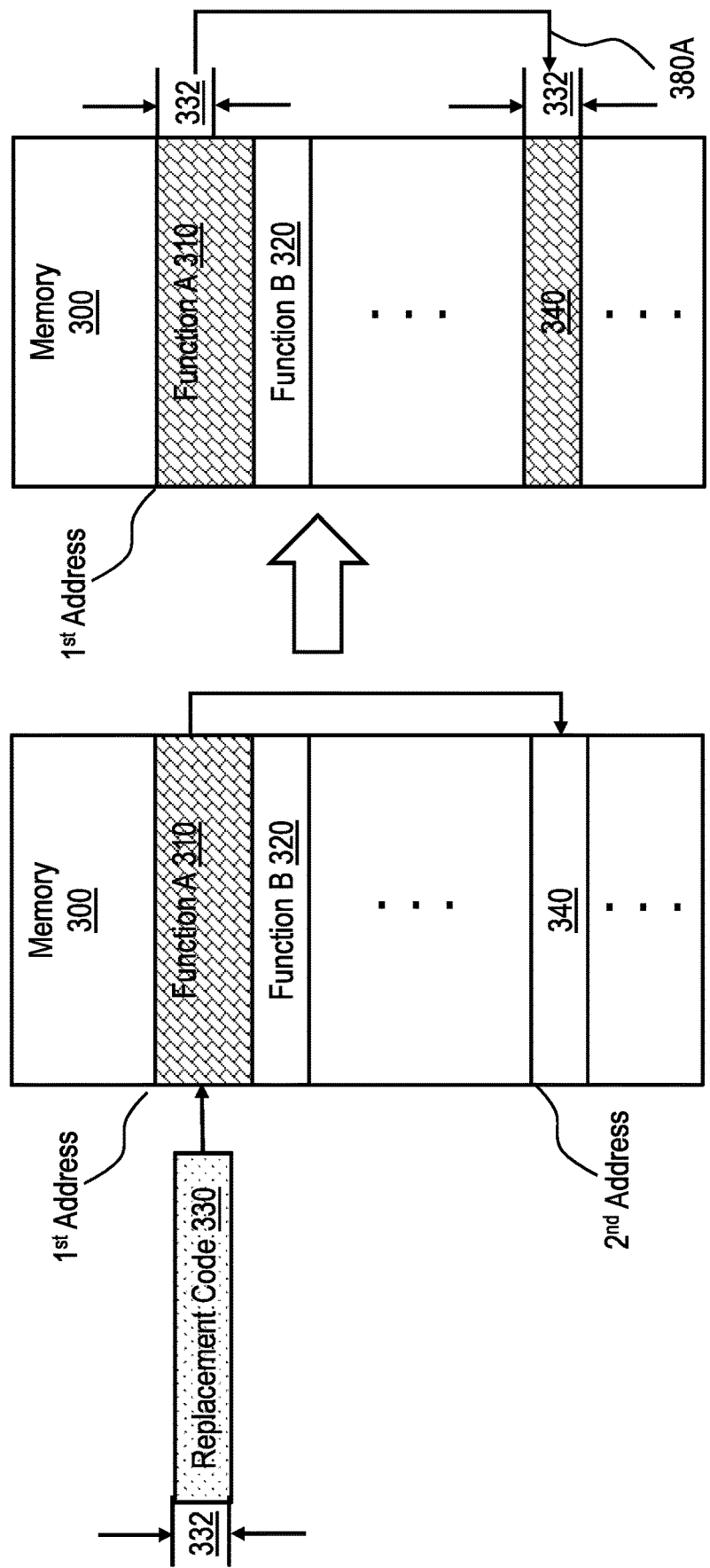
FIGS. 3A-3C illustrate example memory operations performed on program memory for modifying machine code of a function at runtime to change an original behavior of the function.
Figure 3B:
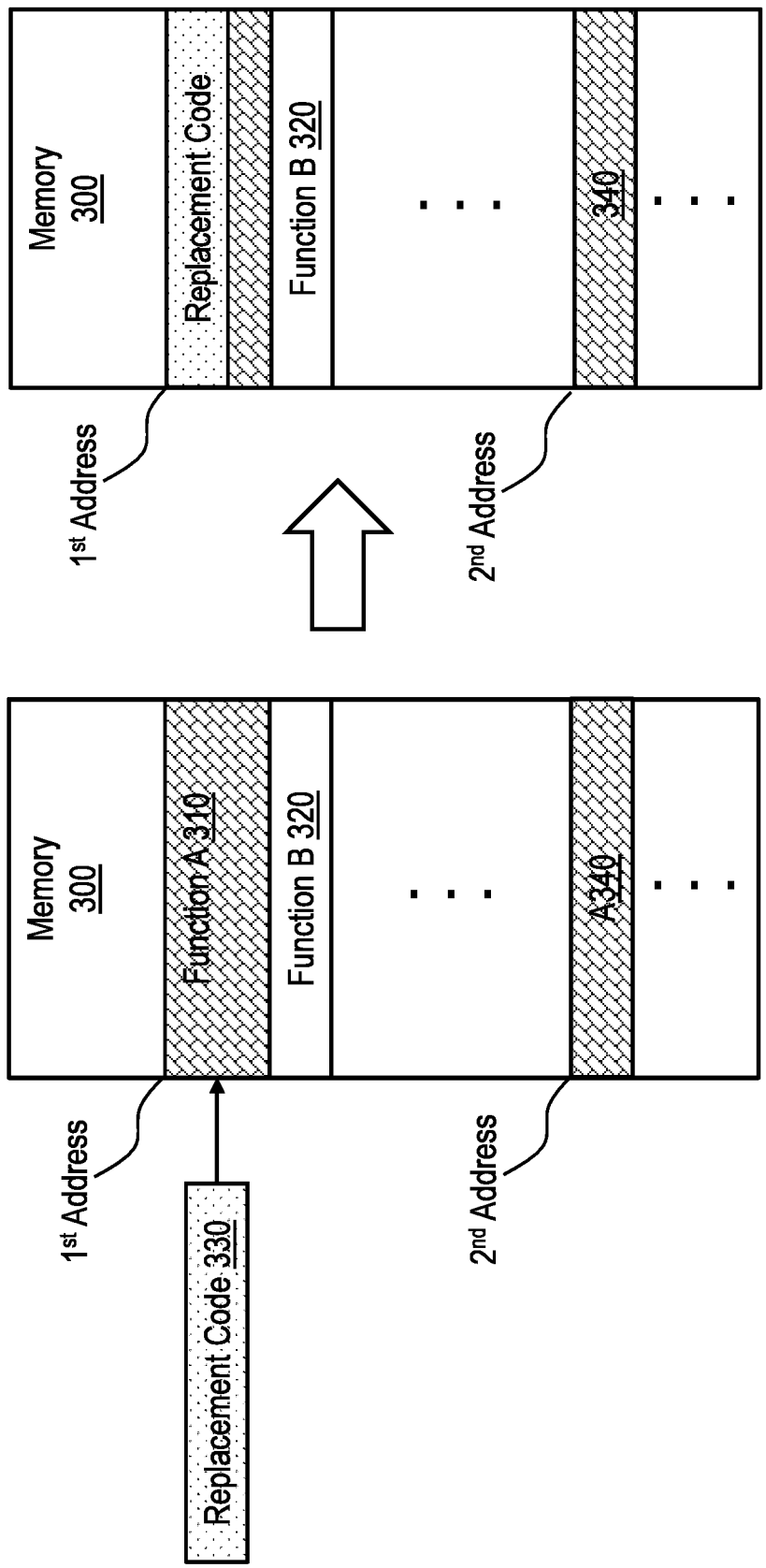
Figure 3C:
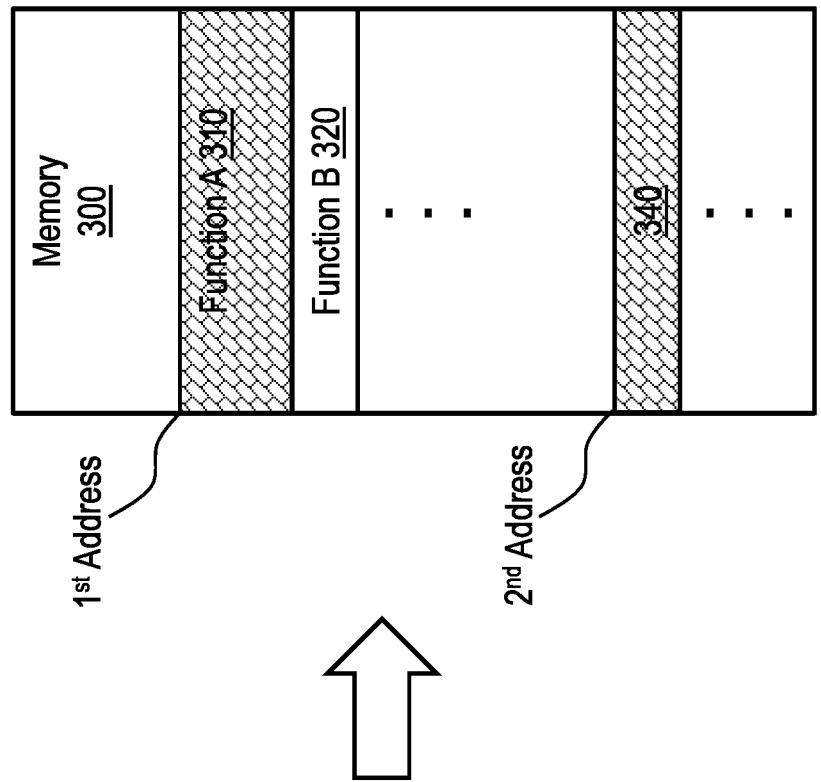
Figure 3C:
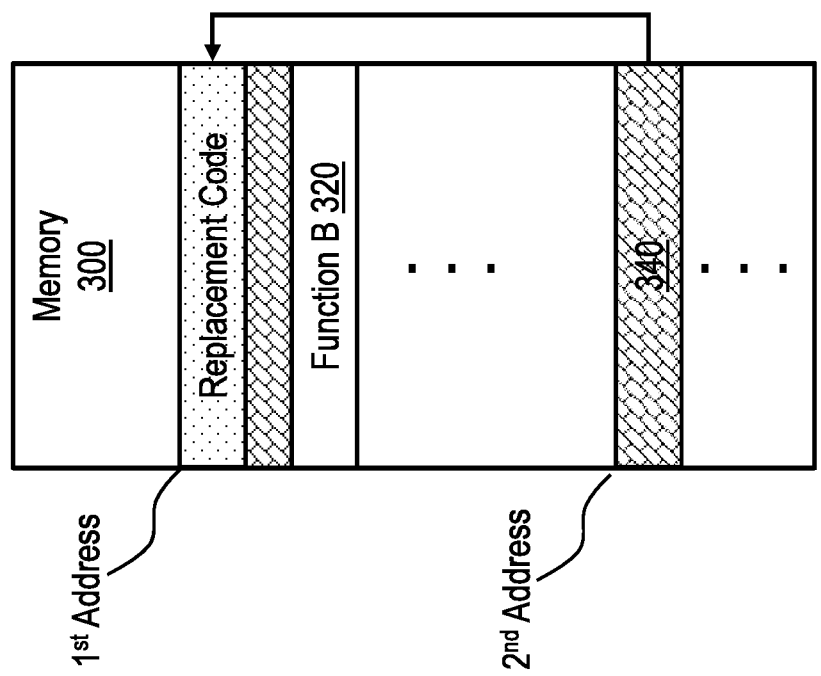

In some embodiments, is the replacement code 240 replaces a function. FIGS. 3A-3C illustrate example memory operations for overriding an original behavior of a function at runtime. As illustrated in FIG. 3A, function A 310 and function B 320 have been loaded or stored in the memory 300. The function A 310 is stored at a first address. After generating replacement code 330 based on a desired override behavior, the computer system determines a size 332 of the replacement code 330, and copies a block of code (e.g., at least beginning a portion of function A) from the first address to a second address of the memory 300 (represented by arrow 380A). As shown on the right side of FIG. 3A, the block of code of function A (having the size 332 of the replacement code) is copied to a block of memory 340.

Referring to FIG. 3B, after the block of code of function A (having the size 332 of the replacement code) is copied to the block of memory 340, the computer system then copies the replacement code 330 to the first address where the block of code of function A was stored. When the code in the block of memory 310 (where the original code of function A used to be stored) is executed, the computer system would behave differently, and the original behavior of function A would have been overridden with the desired override behavior.

Referring to FIG. 3C, after the replacement code is executed, the computer system restores the block of code stored at the second memory address (in the block of memory 340) back to the first address, recovering the original code of function A, and its behavior.

In some embodiments, encoding the replacement code further includes determining whether the size of the replacement code is no greater than a size of the code of the function. In response to determining that the size of the replacement code is no greater than the size of the code of the function, the computer system stores the replacement code at the first memory address, as shown in FIGS. 3A-3C. On the other hand, in response to determining that the size of the replacement code is greater than the size of the code of the function, the computer system performs additional steps to override the original behavior of the function.

Figure 3D:
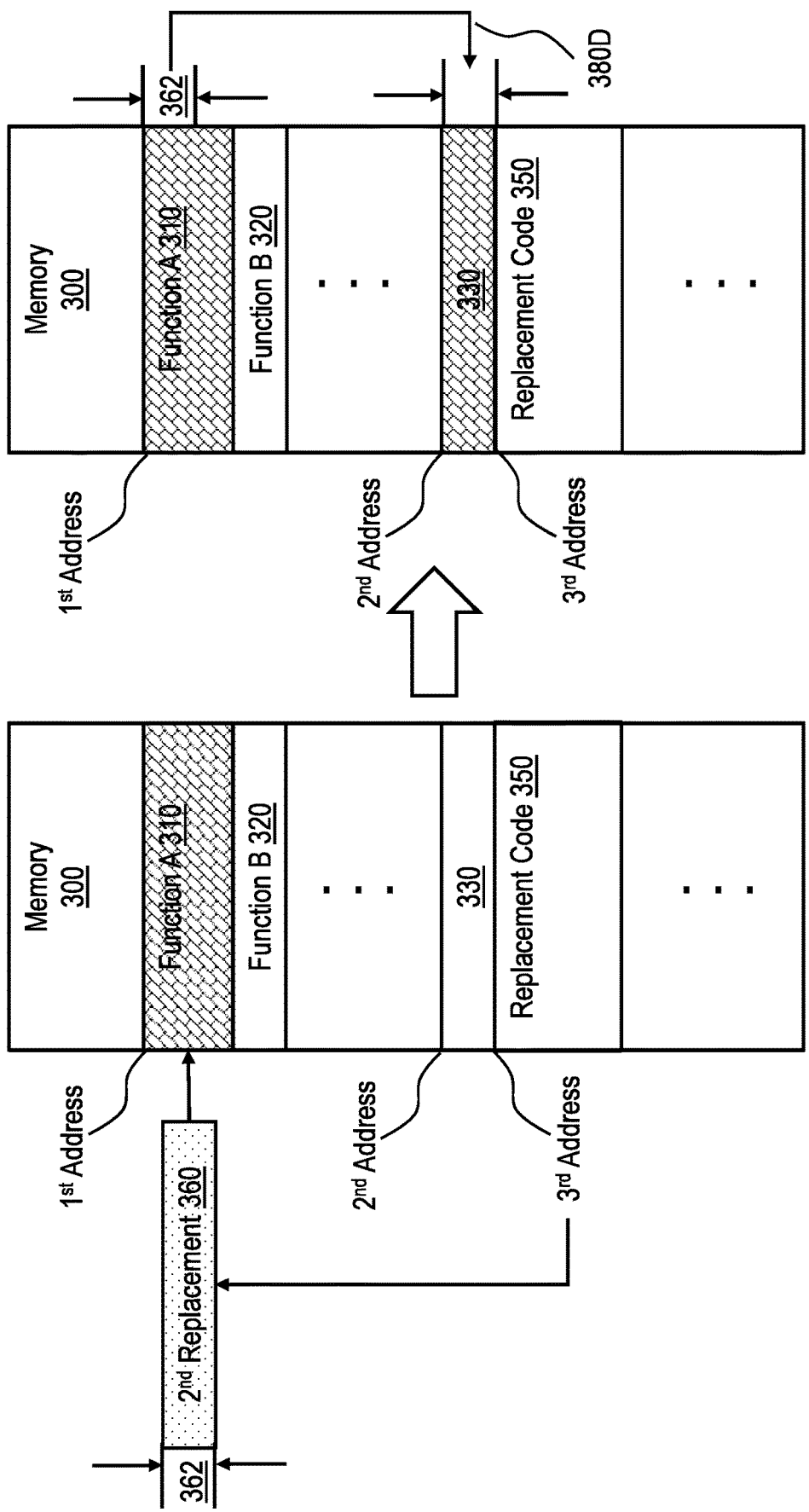
FIG. 3D-3F illustrate additional or different example memory operations performed on program memory for modifying machine code of a function at runtime to change an original behavior of the function.
Figure 3E:
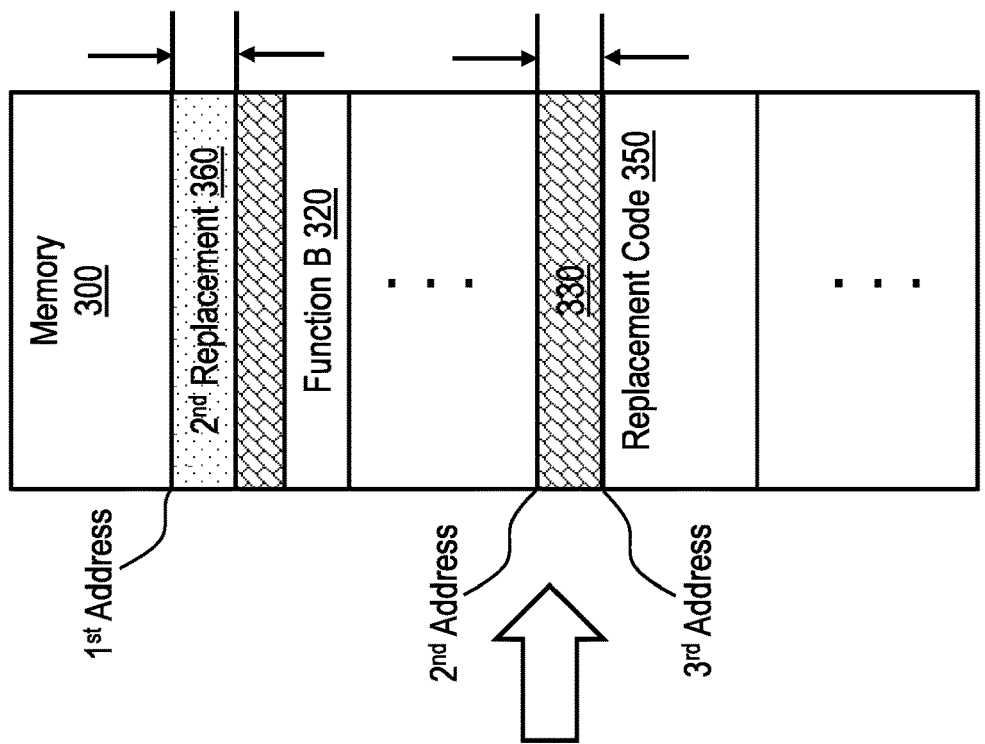
Figure 3E:
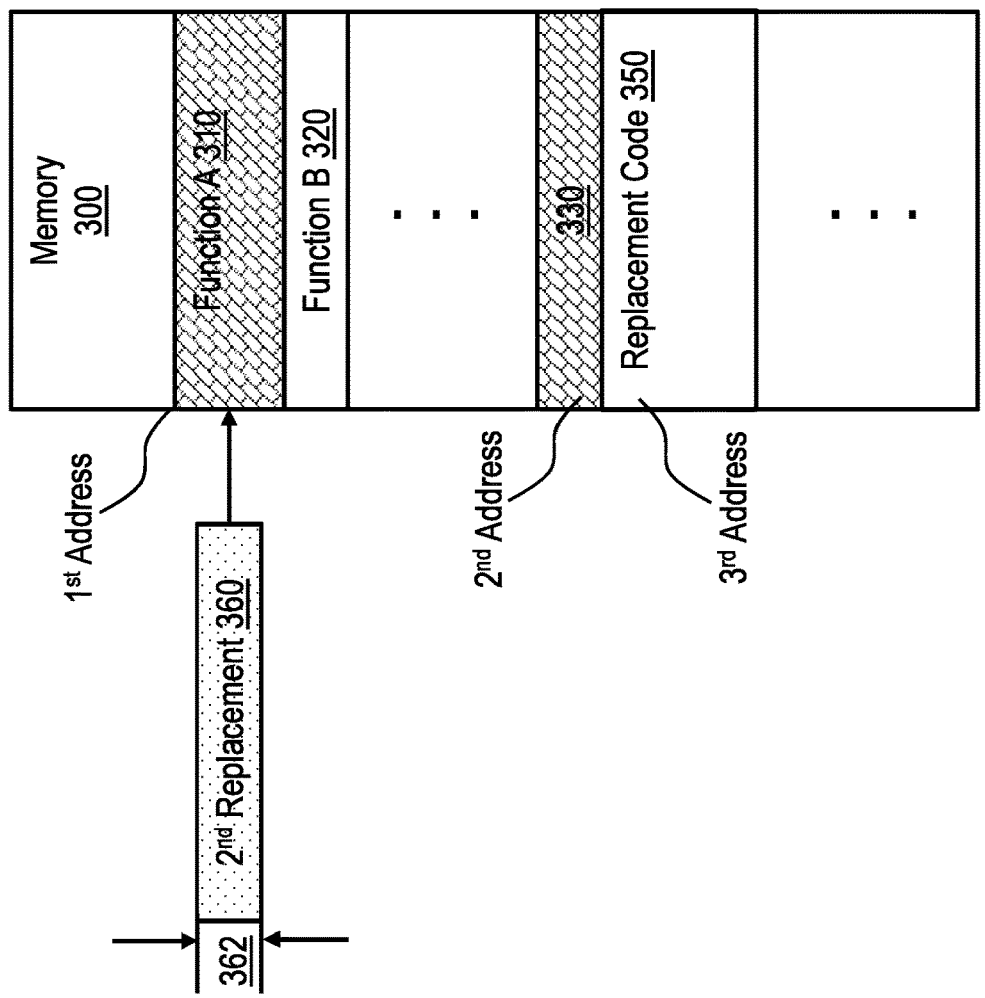

FIGS. 3D-3E illustrate example memory operations for overriding an original behavior of a function when the size of the replacement code is greater than the size of the code of the function. As illustrated in FIG. 3D, the computer system stores the replacement code 350 at a third memory address; and encodes second replacement code 360 based on the third memory address where the replacement code 350 is stored. The computer system then identifies a second size 362 of the second replacement code 360 and copies a second block of code having the second size 362 of the replacement code from the first memory address to the second memory address (represented by arrow 380D).

Thereafter, referring to FIG. 3E, the computer system then copies the second replacement code 360 to the first memory address, pointing to the third memory address where the replacement code 350 is stored. When the second replacement code 360 (pointing to the replacement code 350) is executed, the computer system behaves differently from that of the original code of function A.

Figure 3F:
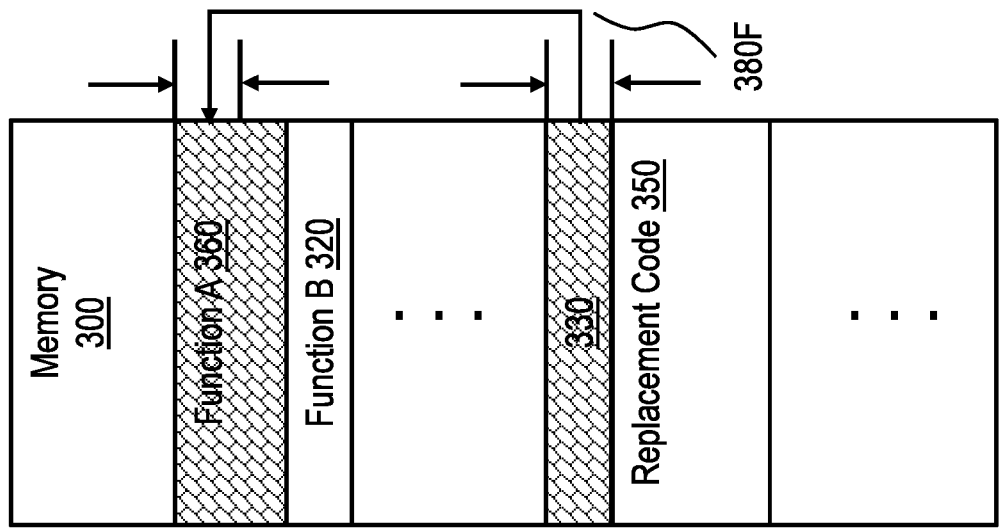
Figure 3F:
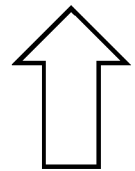
Figure 3F:
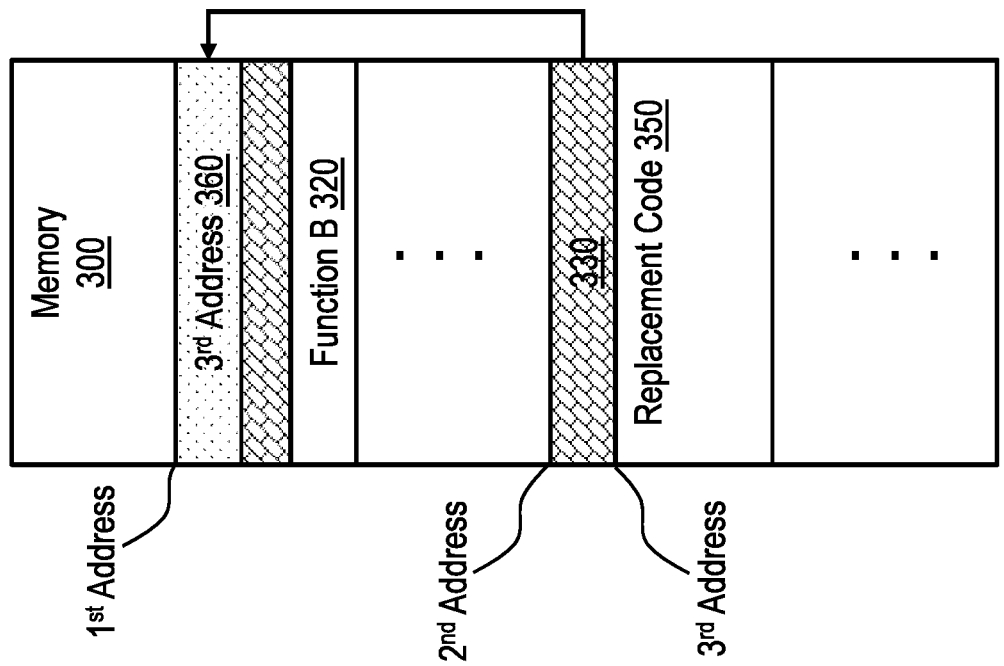

Referring to FIG. 3F, after the second replacement code 360 (pointing to the replacement code 350) is executed, the second block of code stored at the second memory address is then copied back to the first memory address (represented by arrow 380F), recovering the original code of function A, and the original behavior thereof.

In some embodiments, the override behavior includes overriding a return value of the function with a predetermined return value. In some embodiments, the override behavior includes overriding the function with a second function.

In some embodiments, a source code library is generated to allow the above-described overriding behavior to occur when testing a portion of a codebase is performed. For example, to test the two lines of code in the above example source code, an engineer may want the function, VerifyCertInMachine, to return a true Boolean value. In such a case, test code can be written as follows:

```
TheLibrary lib;
lib.IfCalled(VerifyCertInMachine).willReturn(true);
int r = markProcessValidated(p);
ASSERT_TRUE(p->IsValidated);
ASSERT_EQ(0, r);
``` where TheLibrary is a class that implements the overriding behavior. After the top two lines of the above source code, when VerifyCertInMachine is called, a true Boolean value will always be returned during the test, regardless of whether a valid certificate is installed in a local disk. As such, without changing the source code of the function, VerifyCertInMachine, the function, markProcessValidated, can be tested.

Similarly, when the engineer wants the function, VerifyCertInMachine, to return a false Boolean value during a test, the second line of code can be written as:

lib.IfCalled (VerifyCertInMachine).willReturn (false).

In some embodiments, when the override behavior includes overriding a return value of the function, the computer system is further configured to identify a particular register (e.g., the w0 register in the ARM64 ISA) that stores a return value of the function, and encodes replacement code configured to move the predetermined return value into the particular register. In some embodiments, encoding the replacement code further includes determining a size of the return value of the function in machine code format, and encoding the predetermined return value into machine code having the size of the return value. In some embodiments, such as when using the ARM64 ISA, when the predetermined return value is an integer that is less than 8 bits, encoding the predetermined return value includes multiplying the predetermined return value by 32.

Source code or sudo source code below is an example implementation of replacing a return value of a function with a predetermined return value based on a Linux ARM64 system. Notably, similar principles can be implemented in other computer systems having different operating systems and processors.

```
// This function forces a source function always return a given integer value.
// srcFunc: The address of the function to be faked. Must be page aligned.
// returnValue: The value to return in srcFunc.
//
// Assume returnValue is 1, below assembly code will be generated and used to replace original implemnetation of srcFunc:
// mov w0, #0x1
// ret
  void replaceFunction(void* srcFunc, std::uint8_t returnValue)
  {
// The encoding algorithm in linuxarm64 for a integer less than 8bits: encodedValue = orignialVaule * 32
    std::uint16_t base = 32;
// returnValue is 8bits so a 16bits returnValueEncoded is big enough to store the encoded result.
    std::uint16_t returnValueEncoded = (std::uint16_t)(base * returnValue);
// Get the size of encoded value. It's useful when converting integer to byte array later. In this case the size is 2 (bytes)
    int returnValueEncodedSize = sizeof(returnValueEncoded);
// Generating byte array.
    std::vector<unsigned char> asmCode;
    for (int i = 0; i < returnValueEncodedSize; i++)
    {
      // Shift 8 bits to mask out one byte at a time.
      // Notice that i starts from 0 so it's a no-op at this line of code for the first iteration of the loop.
      int tempValue = returnValueEncoded >> (i * 8);
      // Below two lines of code is a trick to cheat compiler for converting int (32bits) to unsigned char (8 bits):
      // First get the address of tempValue.
      void* p = (void*)(&tempValue);
      // Then force cast the pointer from void* to unsigned char* and retrieve the value from the address pointer pointed to. In this way only 8 bits value will be retreived.
Save this value to asmCode(a byte array).
      asmCode.push_back(*(reinterpret_cast<unsigned char*>(p)));
    }
// Now asmCode stores the bytes of returnValueEncoded. The size of asmCode is now 2.
// Assume returnValue is 1, current values in asmCode should be: 0x20 0x00.
(Read from right to left. 0x20 is 32 in decimal. Calculated from 1 * 32).
    // Generate mov instruction machine code.
    // 0x52 0x80 is the machine code for mov instruction.
    asmCode.push_back(0x80);
    asmCode.push_back(0x52);
    // Now asmCode should be: 0x20 0x00 0x80 0x52. This represents below instruction:
    // mov w0, #0x1
    //
    // which means move immediate value 1 to a general purpose register w0.
    // Per the most compilers including gcc, caller for a function returns integer will
retrieve return value from w0 register.
    // Generate ret instruction machien code.
    // 0xD6 0x5F 0x03 0xC0 is the machine code for ret instruction.
    asmCode.push_back(0xC0);
    asmCode.push_back(0x03);
    asmCode.push_back(0x5F);
    asmCode.push_back(0xD6);
    // Now asmCode should be: 0x20 0x00 0x80 0x52 0xC0 0x03 0x5F 0xD6. This represents below 2 instructions:
    // mov w0, #0x1
    // ret
    // which means move immediate value 1 to a general purpose register w0 and return to the address where the function is called (the address is retrieved from register
x30).
    // This 2 instructions do exactly what we expected.
    // memcpy asmCode to the address of the function to be faked. The address needs to be page aligned.
    ReplaceCode(asmCode, srcFunc);
  }
// This function uses the given asmCode to replace the memory data at the address
of srcFunc.
```

```
// Original function data is saved before applying the asm code.
void ReplaceCode(const std::vector<unsigned char>& asmCode, void* srcFunc)
{
    // Save original code including function address and original bytes in memory.
    FuncEntry* pFuncEntry = new FuncEntry( );
    pFuncEntry->funcAddress = srcFunc;
    pFuncEntry->asmCode = new unsigned char[asmCode.size( )];
    pFuncEntry->asmCodeSize = asmCode.size( );
    memcpy(pFuncEntry->asmCode, srcFunc, asmCode.size( ));
    saveFuncEntry(pFuncEntry);
    // Inject hijack code.
    memcpy(srcFunc, asmCode.data( ), asmCode.size( ));
}
// This function recovers all replaced functions to original implementation.
void recoverAllReplacedFunctions( )
{
    // Release all original function asms.
    for (funcEntry in listOfFuncEntries)
    {
        // Recover the original function behavior.
        memcpy(funcEntry->funcAddress, funcEntry->asmCode, funcEntry->asmCodeSize);
        delete funcEntry;
    }
    listOfFuncEntries.clear( );
}
```

The above source code or sudo source code is merely an example of implementation to replace a return value with a predetermined return value. Similar or different source code may also be implemented to achieve the same or similar goals. For example, any portion of the function may be replaced with different code or function. In some embodiments, a particular value of a function may be replaced with another value or another function. In some embodiments, the whole function is replaced with another function.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
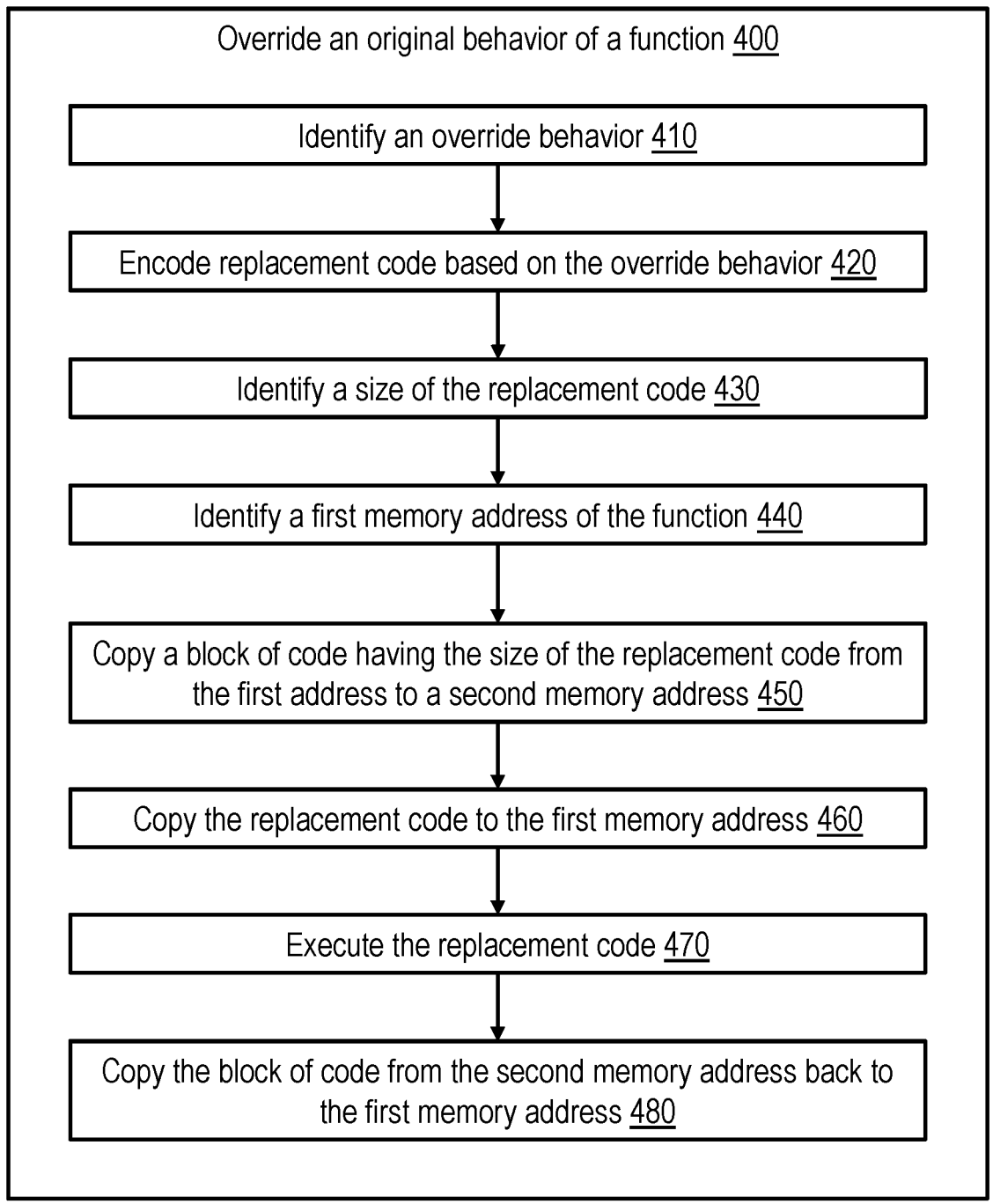
FIG. 4 illustrates a flowchart of an example method for overriding an original behavior of a function.

FIG. 4 illustrates a flowchart of an example method 400 for overriding an original behavior of a function. The method includes identifying an override behavior (act 410), and encoding replacement code based on the override behavior (act 420). The method 400 also includes identifying a size of the replacement code (act 430) and identifying a first memory address of the function that stores code of the function (act 440). Thereafter, a block of code having the size of the replacement code is copied from the first memory address to a second memory address (act 450), and the replacement code is then copied to the first memory address (act 460). After the replacement code is executed (act 470), the block of code stored (having the size of the replacement code) stored at the second memory address is then copied back to the first memory address (act 480), restoring the code of the function.

In some embodiments, the override behavior includes overriding a return value of the function with a predetermined return value. In some embodiments, the override behavior includes overriding the function with a second function. In some embodiments, overriding of a behavior of a function is performed when a portion of a codebase containing the function is being tested. For example, a first function may be called when a second function is executed.

During the process of testing the second function, an engineer may want the first function to return a predetermined value.

Figure 5:
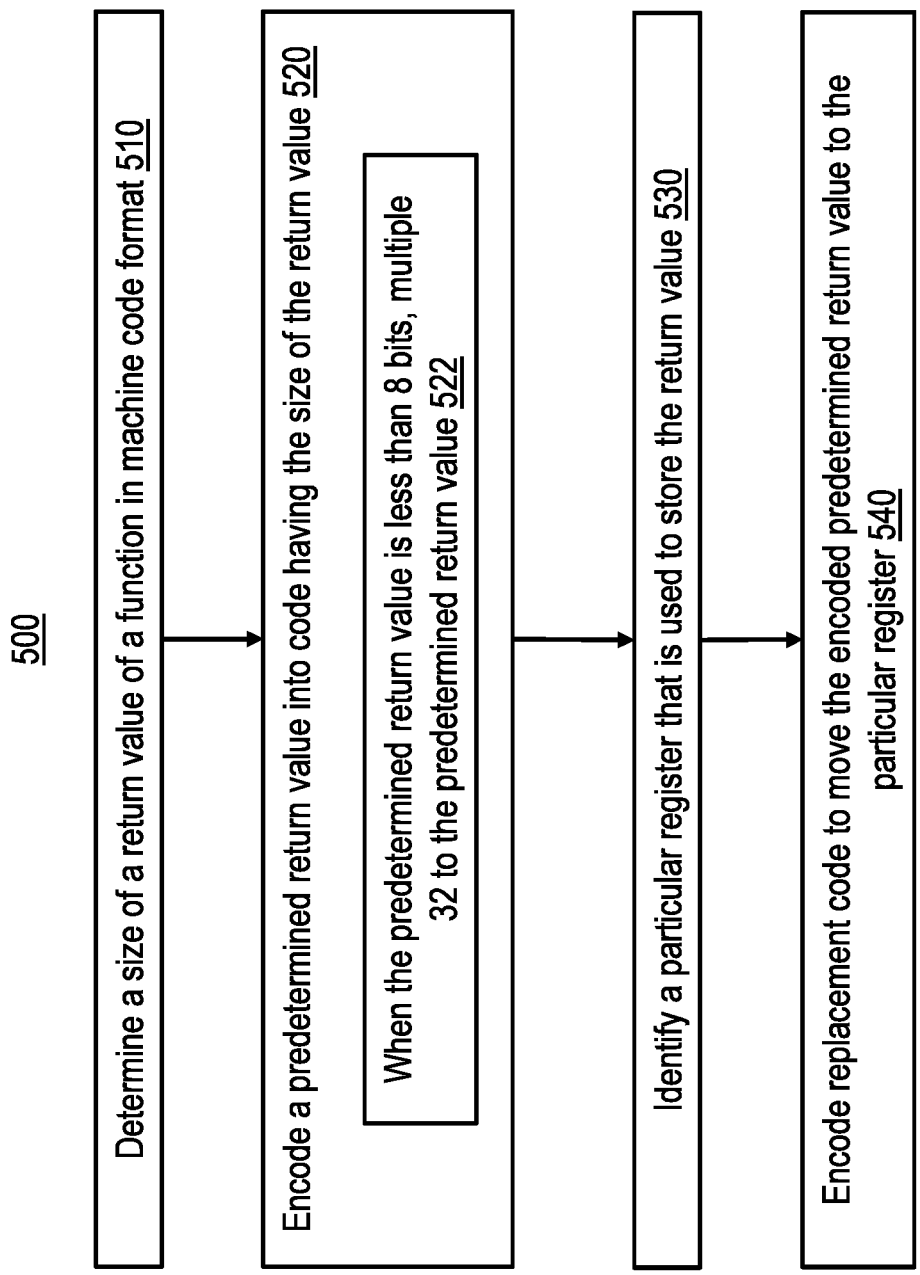
FIG. 5 illustrates a flowchart of an example method for encoding replacement code for overriding a return value of a function with a predetermined return value.

FIG. 5 illustrates a flowchart of an example method 500 for encoding replacement code for replacing a return value of a function with a predetermined return value. The method 500 includes determining a size of the return value of the function in machine code format (act 510) and encoding the predetermined return value into code having the size of the return alue (act 520). In some embodiments, when the predetermined return value is less than 8 bits, the predetermined return value is multiplied by 32 (act 522). The method 500 further includes identifying a particular register that is used to store the return value of the function (act 530), and encoding the replacement code to move the encoded predetermined return value to the particular register (act 540).

Figure 6:
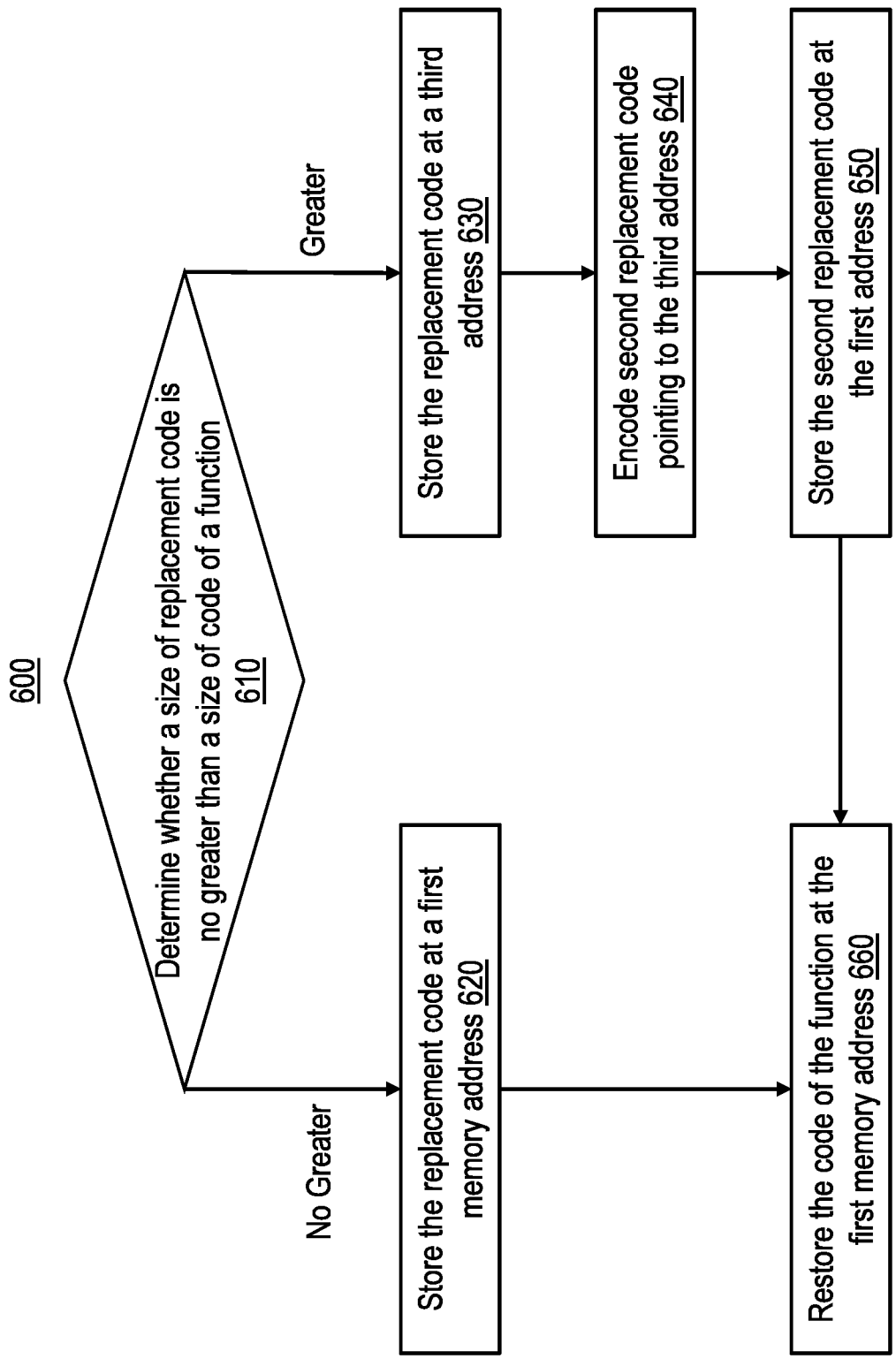
FIG. 6, illustrates a flowchart of an example method for encoding replacement code for overriding an original behavior of a function.

FIG. 6 illustrates a flowchart of another example method (600) for encoding replacement code for overriding an original behavior of a function. The method 600 includes determining whether the size of the replacement code is greater than the size of the code of the function (act 610). In response to determining that the size of the replacement code is greater than the size of the code of the function, the replacement code is then stored at a first memory address of the function where code of the function is stored (act 620). In response to determining that the size of the replacement code is no greater than the size of the code of the function (act 630), second replacement code is encoded to point to the third memory address (act 640). After that, the second replacement code is then stored at the first address of the function (act 650), pointing . . . to the replacement code. Finally, in either case, after the replacement code or second replacement code is executed, the original code of the function is restored at the first address (act 660).

Notably, when the replacement code is to override a return value of the function with a predetermined return value, the replacement code is likely to be fairly small, and does not take more memory than the function. In such a case, acts 620 and 660 are performed. However, when the replacement code is to override a first behavior of a first function with a second behavior of a second function, the code of the second function (which is the replacement code) may take more memory than the code of the first function. In such a case, acts 630, 640, 650, and 660 are performed. For example, when it is known or not sure that the code of the second function takes more memory than the code of the first function, the computer system identifies a third memory address of the second function, and encode the third memory address into second replacement code, causing the second replacement code points to the third memory address of the second function. As such, when the replacement code is executed, the first behavior of the first function is overridden by the second behavior of the second function.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system (e.g., computer system 100) that includes hardware 140, such as, for example, one or more processors (e.g., processor(s) 142) and system memory (e.g., memory 144). Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., memory 144, storage 146). Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from the view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed is:

1. A computer system comprising:
one or more processors; and
one or more computer-readable hardware storage devices having stored thereon computer-executable instructions that configure the computer system to override an original behavior of a function at runtime without changing source code of the function, overriding the original behavior of the function at runtime comprising:
identifying an override behavior for overriding the original behavior of the function, the override behavior including at least one of (1) overriding a return value of the function with a predetermined return value, or (2) overriding the function with a second function;
encoding replacement code based on the override behavior;
identifying a size of the replacement code;
identifying a first memory address of the function where code of the function is stored;
copying a block of code having the size of the replacement code from the first memory address to a second memory address;
copying the replacement code to the first memory address; and
after the replacement code is executed, copying the block of code stored at the second memory address back to the first memory address, restoring the code of the function, wherein:
when the override behavior includes overriding the return value of the function with the predetermined return value, encoding the replacement code comprises:
identifying a particular register that stores a return value of the function; and
encoding the replacement code configured to move the predetermined return value into the particular register.

2. The computer system of claim 1, wherein encoding the replacement code further includes:
determining whether the size of the replacement code is no greater than a size of the code of the function; and
in response to determining that the size of the replacement code is no greater than a size of the code of the function, storing the replacement code at the first memory address.

3. The computer system of claim 1, wherein encoding the replacement code further comprises:
in response to determining that the size of the replacement code is greater than a size of the code of the function, storing the replacement code at a third memory address;
encoding second replacement code containing the third memory address where the replacement code is stored;
identifying a second size of the second replacement code;
copying a second block of code having the second size of the replacement code from the first memory address to the second memory address;
copying the second replacement code to the first memory address, pointing to the third memory address where the replacement code is stored; and
after the replacement code is executed, copying the second block of code stored at the second memory address back to the first memory address.

4. The computer system of claim 1, wherein encoding the replacement code further comprises:
determining a size of the return value of the function in machine code format; and
encoding the predetermined return value into machine code having the size of the return value.

5. The computer system of claim 4, wherein when the predetermined return value is an integer that is less than 8 bits, encoding the predetermined return value includes multiplying the predetermined return value by 32.

6. The computer system of claim 1, wherein when the override behavior includes overriding the function with the second function, encoding the replacement code includes:
identifying a third memory address of the second function where code of the second function is stored; and
encoding the third memory address into the replacement code.

7. The computer system of claim 1, wherein the one or more processors include an ARM64 processor.

8. The computer system of claim 1, wherein overriding the original behavior of the function is performed on a Linux-based operating system.

9. The computer system of claim 1, wherein source code of the function is in C++.

10. The computer system of claim 1, wherein:
the function is a first function,
a second function is configured to call the first function, and overriding the original behavior of the first function is caused to be performed when the second function is being tested.

11. The computer system of claim 1, wherein:
the function is a function in a codebase, and
the computer system overrides the original behavior of the function when a portion of the codebase is being tested.

12. A method implemented at a computer system for overriding an original behavior of a function at runtime without changing source code of the function, the method comprising:
identifying an override behavior for overriding the original behavior of the function, the override behavior including at least one of (1) overriding a return value of the function with a predetermined return value, or (2) overriding the function with a second function;
encoding replacement code based on the override behavior;
identifying a size of the replacement code;
identifying a first memory address of the function where code of the function is stored;
copying a block of code having the size of the replacement code from the first memory address to a second memory address;
copying the replacement code to the first memory address; and
after the replacement code is executed, copying the block of code stored at the second memory address back to the first memory address, restoring the code of the function, wherein:
when the override behavior includes overriding the return value of the function with the predetermined return value, encoding the replacement code comprises:
identifying a particular register that stores a return value of the function; and
encoding the replacement code configured to move the predetermined return value into the particular register, and
when the override behavior includes overriding the function with the second function, encoding the replacement code includes:
identifying a third memory address of the second function where code of the second function is stored; and
encoding the third memory address into the replacement code.

13. The method of claim 12, wherein encoding the replacement code further includes:
determining whether the size of the replacement code is no greater than a size of the code of the function; and
in response to determining that the size of the replacement code is no greater than the size of the code of the function, storing the replacement code at the first memory address.

14. The method of claim 13, wherein encoding the replacement code further comprises:
in response to determining that the size of the replacement code is greater than the size of the code of the function, storing the replacement code at a third memory address;
encoding second replacement code containing the third memory address where the replacement code is stored;
identifying a second size of the second replacement code;

copying a second block of code having the second size of the replacement code from the first memory address to the second memory address;
copying the second replacement code to the first memory address, pointing to the third memory address where the replacement code is stored; and
after the replacement code is executed, copying the second block of code stored at the second memory address back to the first memory address.

15. The method of claim 12, wherein when the predetermined return value is an integer that is less than 8 bits, encoding the predetermined return value includes multiplying the predetermined return value by 32.

16. The method of claim 12, wherein when the override behavior includes overriding the return value of the function with the predetermined return value, encoding the replacement code comprises:
identifying a particular register that stores a return value of the function; and
encoding the replacement code configured to move the predetermined return value into the particular register.

17. The method of claim 12, wherein:
the function is a function in a codebase, and
overriding the original behavior of the function is caused to be performed when a portion of the codebase is being tested.

18. A computer program product comprising one or more hardware storage devices having stored thereon computer-executable instructions that are structured such that, when the computer-executable instructions are executed by one or more processors of a computer system, the computer system is configured to perform:
identify an override behavior for overriding an original behavior of a function, the override behavior including at least one of (1) overriding a return value of the function with a predetermined return value, or (2) overriding the function with a second function;
encode replacement code based on the override behavior;
identify a size of the replacement code;
identify a first memory address of the function where code of the function is stored;
copy a block of code having the size of the replacement code from the first memory address to a second memory address;
copy the replacement code to the first memory address; and
after the replacement code is executed, copy the block of code stored at the second memory address back to the first memory address, restoring the code of the function, wherein:
when the override behavior includes overriding the return value of the function with the predetermined return value, encoding the replacement code comprises:
identifying a particular register that stores a return value of the function; and
encoding the replacement code configured to move the predetermined return value into the particular register, and
when the override behavior includes overriding the function with the second function, encoding the replacement code includes:
identifying a third memory address of the second function where code of the second function is stored; and
encoding the third memory address into the replacement code.

19. The computer program product of claim 18, wherein encoding the replacement code further includes:
- determining whether the size of the replacement code is no greater than a size of the code of the function; and
- in response to determining that the size of the replacement code is no greater than a size of the code of the function, storing the replacement code at the first memory address.

20. The computer program product of claim 18, wherein encoding the replacement code further comprises, in response to determining that the size of the replacement code is greater than a size of the code of the function:
- storing the replacement code at a third memory address;
- encoding second replacement code containing the third memory address where the replacement code is stored;
- identifying a second size of the second replacement code;
- copying a second block of code having the second size of the replacement code from the first memory address to the second memory address;
- copying the second replacement code to the first memory address, pointing to the third memory address where the replacement code is stored; and
- after the replacement code is executed, copying the second block of code stored at the second memory address back to the first memory address.

* * * * *